United States Patent [19]

Syme

[11] 4,249,509
[45] Feb. 10, 1981

[54] WOOD BURNING APPARATUS HAVING IMPROVED EFFICIENCY

[75] Inventor: Duncan C. Syme, Chelsea, Vt.

[73] Assignee: Vermont Castings, Inc., Randolph, Vt.

[21] Appl. No.: 884,998

[22] Filed: Mar. 9, 1978

[51] Int. Cl.³ ............................................. F24C 1/14
[52] U.S. Cl. ........................................ 126/77; 126/83
[58] Field of Search ............... 126/104, 1 AC, 1 AD, 126/1 AE, 58, 60, 61, 62, 63, 67, 69, 77, 108, 110 C, 114, 6, 66; 422/109; 423/65, 96; 431/76; 60/276, 286; 110/8

[56] References Cited

U.S. PATENT DOCUMENTS

| | | | |
|---|---|---|---|
| 1,280,235 | 10/1918 | Kermode | 126/77 X |
| 2,456,570 | 12/1948 | Stuckey et al. | 126/77 X |
| 2,845,882 | 8/1958 | Bratton | 110/8 |
| 3,022,782 | 2/1962 | Bryant | 126/83 X |
| 3,259,083 | 7/1966 | Evans | 110/8 |
| 3,306,035 | 2/1967 | Morrell | 60/286 |
| 3,362,387 | 1/1968 | Neumann et al. | 60/276 X |
| 3,491,707 | 1/1970 | Bakker | 110/8 |
| 3,526,196 | 9/1970 | Seversky | 110/8 |
| 3,683,625 | 8/1972 | McCrink | 60/276 |
| 3,723,070 | 3/1973 | Houdry | 60/286 X |
| 3,818,682 | 6/1974 | Farrow et al. | 423/659 G X |
| 3,837,303 | 9/1974 | Baardson | 110/8 |
| 3,958,936 | 5/1976 | Knight, Jr. | 21/93 |
| 4,078,541 | 3/1978 | Roycraft | 126/77 X |

FOREIGN PATENT DOCUMENTS

1472591 5/1977 United Kingdom ........................ 126/77

*Primary Examiner*—Samuel Scott
*Assistant Examiner*—Randall L. Green
*Attorney, Agent, or Firm*—Kenway & Jenney

[57] ABSTRACT

An improved wood burning apparatus and method having increased secondary combustion are disclosed. Unburned combustibles from a primary combustion chamber are combined with an oxygen containing gas, such as air, and thereafter pass through a selectively operated electrical heating element which promotes secondary combustion. The combustion products from the secondary combustion are monitored so that if secondary combustion is not sufficiently complete, the heating element is activated to promote increased secondary combustion thereby providing an increased overall efficiency for the heating apparatus.

15 Claims, 7 Drawing Figures

WOOD BURNING APPARATUS HAVING IMPROVED EFFICIENCY

The invention relates generally to a heating apparatus and method and in particular, to a wood burning heating apparatus and method having improved secondary combustion.

BACKGROUND OF THE INVENTION

In the 1800's and before, coal and wood burning stoves were looking to for heating both homes and businesses. Today, as oil and gas prices rise, coal and wood burning heating apparatus are again being turned to as a heating source. Unlike the modern high efficiency gas and oil burning equipment, however, wood and coal burning stoves have generally had a relatively low efficiency because they do not completely burn and hence do not completely utilize the heat value of the fuel.

Thus, typical wood burning stoves, the most well known of which is probably the Franklin stove, though practical for their time, burn wood inefficiently. The Franklin stove, like most cast iron stoves available today, provides for updraft combustion, such as is found in a fireplace and in which the volatile gases (volatiles), which are driven off as the wood burns, are generally left unburned. The unburned volatiles remain for two reasons, first because the gases, by the time they have left the wood, are generally too cool for secondary combustion and second, because oxygen that is admitted to the stove or fireplace is usually consumed by the coals at the base of the fire mass, causing the gases to rise through an oxygen-deficient atmosphere. The loss of the hot, unburned volatile gases is a serious problem, because they represent approximately half of the total heat value of the wood. It is as though one were to run an open line of natural gas up a chimney without bothering to ignite it first. In addition, the volatile gases given off from the wood without being ignited may condense on the cool sides of long metal flue pipes and drip out as creosote which may sometimes be inadvertently and dangerously burned, in their solid creosote form, as a chimney fire.

Some modern wood burning apparatus, such as the DEFIANT and VIGILANT (DEFIANT and VIGILANT are trademarks of Vermont Catings, Inc. of Randolpha, Vermont) parlor stoves manufactured by the assignee of this application, provide increased secondary combustion, which increases the stove's overall efficiency. In addition, the DEFIANT and the VIGILANT each have a horizontal combustion configuration, which increases the completeness with which fuel is burned in the primary combustion chamber. Nevertheless, there still remains in the escaping gases, a significant amount of heat energy because the secondary combustion is not complete.

There are probably many reasons for incomplete secondary combustion of the gaseous volatiles. In copending application Ser. No. 837,608, filed Sept. 28, 1977 and assigned to the assignee of this application, secondary combustion has been aided by providing preheated, oxygen-containing air close to the gaseous connection between the primary and secondary combustion chambers and hence at a time when the gases are hotter and more likely to burn in an oxygen rich environment. While this appears to promote better secondary combustion, there still remains, as noted above, a significant quantity of unburned gas in the escaping flue gases, whose energy, if tapped, would provide a significant increase in the efficiency of the heating apparatus.

Therefore a primary object of the invention is a heating apparatus and method having increased combustion efficiency. Other objects of the invention are a wood burning heating apparatus and method which promotes significant secondary combustion, which provides reliable operation, and which has relatively low fuel consumption.

SUMMARY OF THE INVENTION

The heating apparatus, according to the invention, operates on the principle that by providing an externally powered, selectively actuated electric heat source between the primary and secondary combustion chambers of the apparatus, an increase in the overall operating efficiency of the apparatus can be achieved. Thus, the apparatus according to the invention features a heat conducting frame member enclosing a primary combustion chamber and a secondary combustion chamber in gaseous communication with the primary combustion chamber. A baffle member, separating the primary and secondary combustion chambers has an opening connecting the primary and secondary combustion chambers for providing the gaseous communication therebetween. An air supply means provides air for promoting combustion in the primary combustion chamber. An air mixing means mixes air with the combustion products from the primary combustion chamber to provide a mixed gas flow and a second air supply means provides the air to the air mixing means. The invention further features an electric heating member positioned adjacent the mixing means for selectively heating the mixed gaseous flow from the mixing means to promote secondary combustion of the combustion products in the secondary combustion chamber. The secondary combustion products exit the frame member through a combustion products exit aperture at the top portion of the frame member and the exit aperture is in gaseous communication with the secondary combustion chamber.

In a preferred aspect of the invention, there are provided means for detecting the efficiency of secondary combustion and means for selectively operating the electric heating member accordingly thereto. In this manner, the electrical heating member is actuated only in those times when the efficiency of the heating apparatus is below a preselected threshold. Therefore, the apparatus, according to the invention, actuates the electrical heating member only when the apparatus is operating inefficiently. When the completeness of secondary combustion exceeds a predetermined minimum threshold as measured by a secondary combustion efficiency measuring element, the electric power input to the electrical heating element is not actuated, and there is substantially no additional power consumption by the heating apparatus. Thus, the temperature of the gases in the secondary combustion chamber can be maintained at a level sufficient to ensure substantial secondary combustion and hence maintain a high overall efficiency for the heating apparatus.

In another aspect of the invention, the electric heating member comprises a plurality of thin electric resistance heating elements and the invention further features means for supporting the elements in a crossing, rectilinear grid. Preferably, the elements extend at right angles to one another in the grid.

In another aspect of the invention, the mixing means features a plurality of venturi passages for creating a low pressure section for urging the secondary air to mix with the primary combustion products. Means are further provided for creating turbulence in the mixed air flow for promoting a more uniform mixing of the gases.

The method for increasing combustion efficiency in a wood burning parlor stove features the steps of mixing the combustion products from a primary combustion zone with an oxygen containing atmosphere at a mixing flow zone; selectively heating the mixture to a temperature at which secondary combustion of the mixture occurs; and providing an exit aperture for the secondary combustion products to exit from the stove. The heating step comprises exposing the mixture to a selectively heated electric element positioned adjacent the mixing zone and in the path of the mixed gas flow.

In another aspect of the invention, the method features the steps of generating from the secondary combustion products a measure representative of the unburned combustibles and activating the electric heating element whenever the measure is greater than a predetermined threshold.

DESCRIPTION OF THE DRAWINGS

Other features, objects, and advantages of the invention will appear from the following description of a preferred embodiment of the invention taken together with the drawings, in which.

DESCRIPTION OF A PREFERRED EMBODIMENT

General Description

Figure 1:
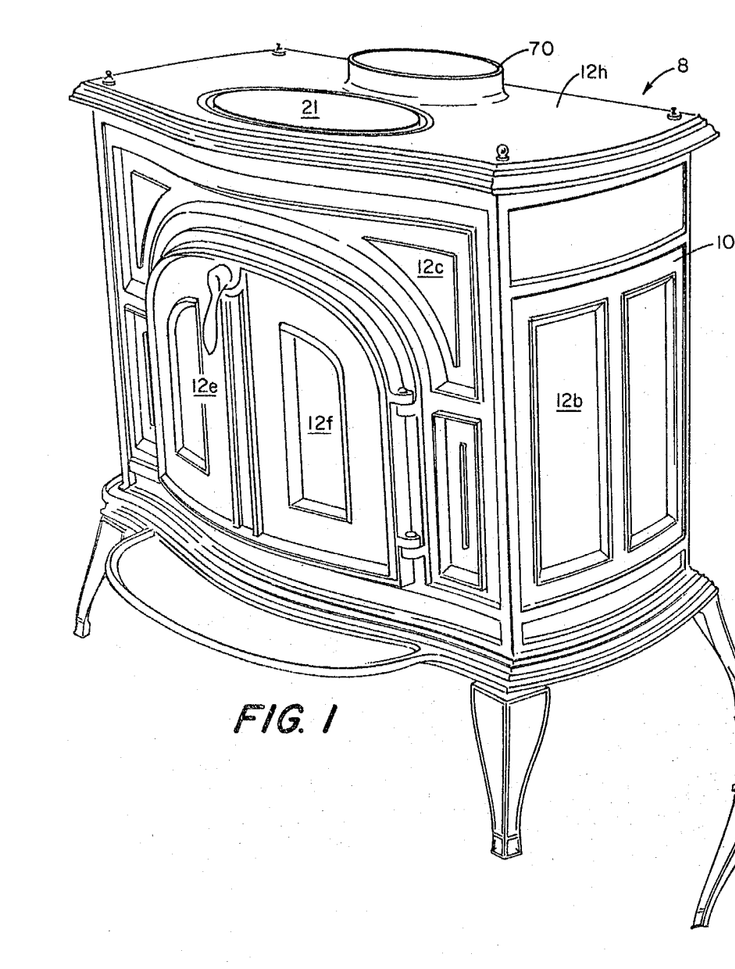
FIG. 1 is a front perspective view of a heating apparatus incorporating the invention.

Referring to FIG. 1, a wood burning heating apparatus 8 has an exterior frame member 10 preferably comprised of a heavy-duty cast iron. The sides 12a, 12b, front 12c with doors 12e, 12f, back 12g, top 12h, and bottom 12i of the frame member are joined in a channeled construction to form an integral, air-tight unit. The front pivoting doors 12e, 12f, allow the heating apparatus to be opened from the front for both loading of wood and for viewing the fire when the heating apparatus is used as a fireplace. A pivoting side door 14 of the apparatus, has hinges 15a, 15b which allow it to pivot about a vertical rotation axis, whereby wood may be loaded into a primary combustion chamber 16 (FIG. 3) from the side of the apparatus. In its closed position, door 14 seals against a gasketing material such as a one-quarter inch diameter asbestos rope sealing member. Door 14 interlocks with a damper 18 (FIGS. 3 and 4) whose position is controlled by a handle 20 so that the door can be fully opened only when the apparatus is in an updraft combustion configuration as described in more detail below. Illustrated top member 12h supports a cast iron cooking surface 21.

Figure 2:
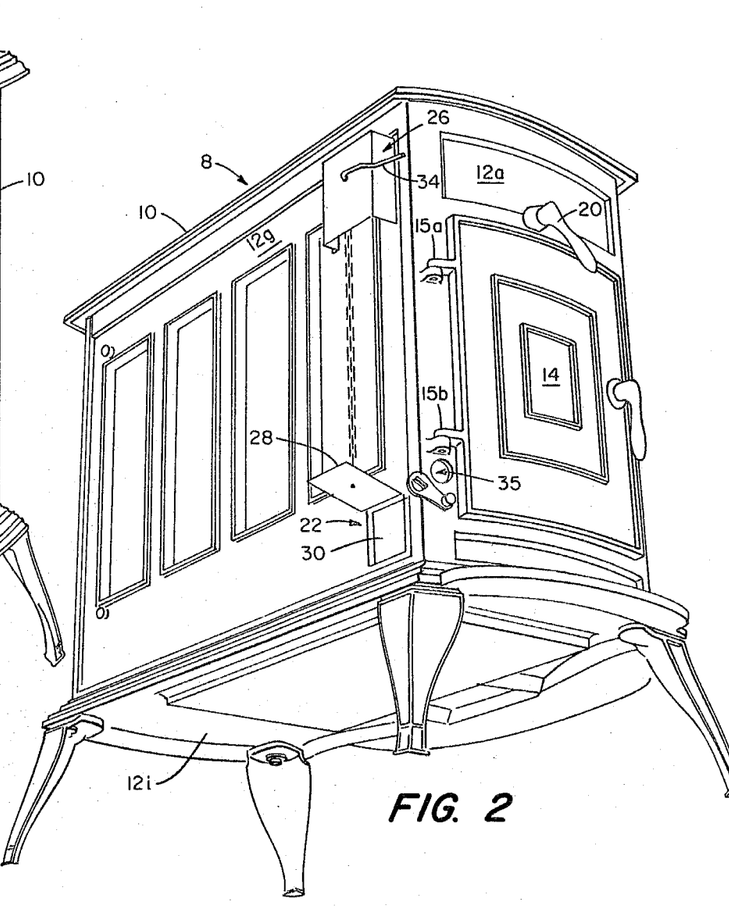
FIG. 2 is a back perspective view of the heating apparatus of FIG. 1.
Figure 3:
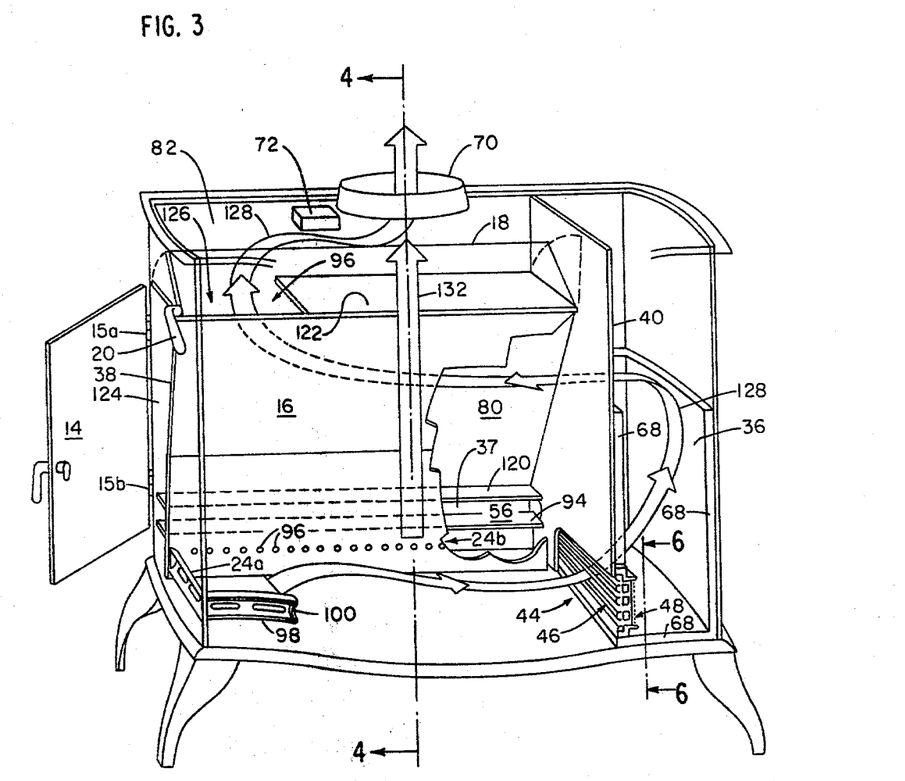
FIG. 3 is a cut-away front perspective view of the heating apparatus of FIG. 1.
Figure 4:
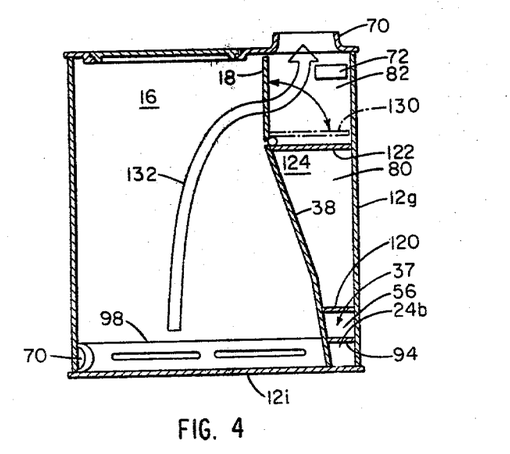
FIG. 4 is a cross-sectional view taken along lines 4—4 of FIG. 3.

Referring to FIGS. 2 and 3, air is supplied to the primary combustion chamber 16, through a primary inlet port 22, by a primary air supply flow path having branches 24a, 24b, (FIGS. 3 and 4). Inlet port 22 is thermostatically controlled by a thermostat 26 which operates a pivoting damper 28, removably covering an aperture 30 in the back frame member 12g. Thermostat 26 is, for example, an 8" coil of bimetallic material connected to damper 28 by a flexible chain 32. Heating apparatus 8 also has a damper control lever 34 for regulating thermostat 26. A manually controlled secondary air inlet port 35 in side member 12a provides air for secondary combustion in a secondary combustion chamber 36 (FIG. 3). The secondary air is provided through a secondary air flow path 37.

Referring to FIG. 3, primary air entering through aperture 30 travels through primary air supply paths 24a, 24b and is heated by contact with the hot walls which define the supply paths 24a, 24b. Thus, the primary air is preheated and therefore helps to keep a hotter fire going with less air and wood being consumed. The primary combustion chamber is bounded by the substantially vertically oriented downwardly extending fireback baffle 38, side door 14 and side wall 12a of the frame member, the front doors 12e, 12f and front wall 12c of the frame member, the top 12h and bottom 12i frame member panels, and a vertically oriented interior panel 40 which separates the primary combustion chamber from the secondary combustion chamber 36.

Secondary Combustion-An Auxiliary Heating Element

The secondary combustion chamber is connected to and is in gaseous communication with the primary combustion chamber through an opening 44 in panel 40. The secondary combustion chamber is bounded by the vertically oriented panel 40 in combination with frame members 12b, 12c, 12g, 12h, and 12i.

Opening 44 circumferentially encloses mixing element 46 and an auxiliary heating element 48. (FIGS. 3, 5, and 6) The mixing element is preferably a cast ceramic device having a plurality of restricted, transversely extending, slotted channels 50 through which gaseous correspondence from the primary combustion chamber 16 to the secondary combustion chamber 36 takes place. The partially oxidized gases exiting from the primary combustion chamber thus pass through restricted channels 50 in mixing element 46. Channels 50 are shaped and sized to provide a venturi effect as the gases pass therethrough; that is, as the gases pass through channels 50, their flow velocity increases, and the higher velocity gas flow creates a low pressure area in the channels. The lowest pressure occurs at the narrowest portion of the channel opposite openings 52 into cavities 54. The cavities 54 preferably extend transversely across the opening 44 and the openings 52 are preferably slotted and extend across the transverse dimension of the opening 44. The middle cavities 54 and channels 50 are defined by transversely extending semicircular ceramic members 54a in combination with transversely extending trailing members 54b. The middle openings 52 are defined by the spacing between semi-circular member 54a and the adjacent trailing member 54b.

At the top and bottom of opening 44, transversely extending element sections 54c and 54d provide and define the top and bottom cavities 54 and the top and bottom openings 52. The elements 54c, 54d have a one piece integral cast ceramic construction. All of transversely extending cast ceramic members 54a, 54b, 54c, and 54d are supported in ceramic supporting end members 54e, 54f. (FIG. 6) End piece 54f also defines a gas manifold 55.

Figures 5, 7:
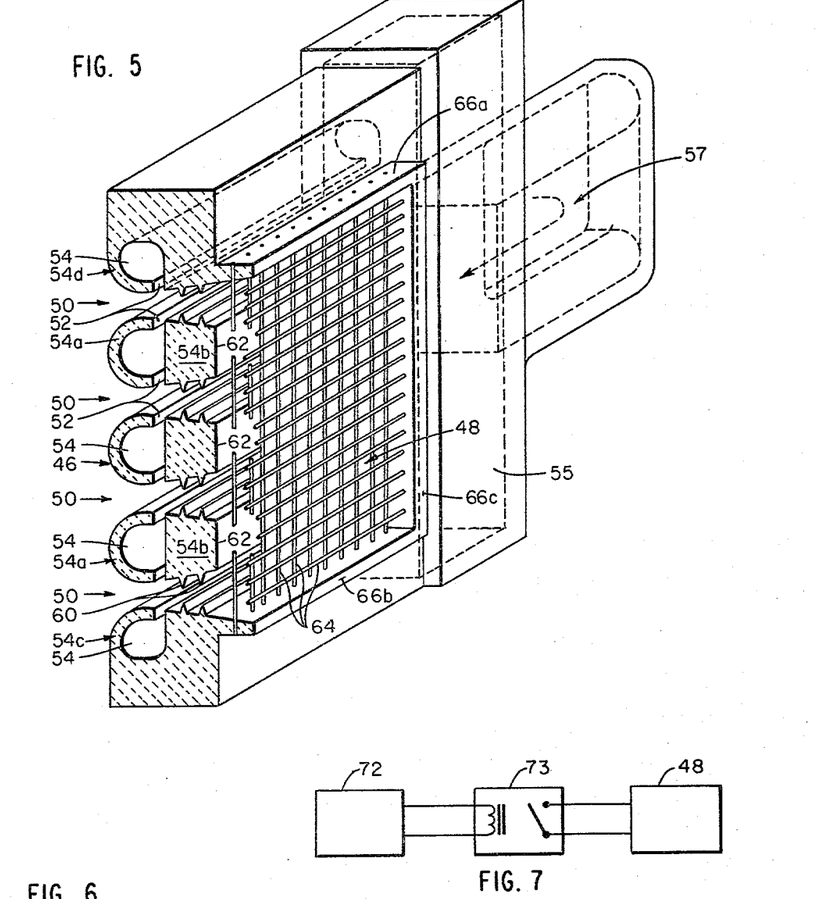
FIG. 5 is a perspective view of the mixing and heating elements (including a portion of the secondary air path) according to a preferred embodiment of the invention.
FIG. 7 is an electrical block diagram showing the electrical system according to the invention.
Figure 6:
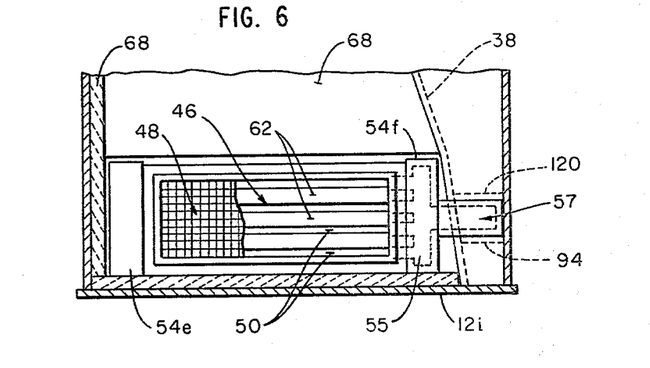
FIG. 6 is a partially broken away sectional view taken along lines 6—6 of FIG. 3.

Cavities 54 are in gaseous communication with the secondary air supply flow path 37 through the vertical air manifold 55 in mixing element 46. Thus air from inlet port 35 passes through flow path 37 to manifold 55 and then to the transversely extended cavities 54. (The flow path 37 comprises a first imperforate section 56 which extends from the inlet portion 35, along fireback baffle 38, to panel 40 and a second imperforate section 57 which extends from section 56 along panel 40 to the manifold 55.)

The low pressure areas existing at cavity openings 52 tend to urge air from the cavities into channels 50 since the "low pressure" in the channels is less than the atmospheric pressure level of the incoming air. This causes the oxygen containing air to mix with the higher velocity gases or combustion products from the primary combustion chamber. The plural trailing members 54b have protrusions 60 and flat trailing portions 62 to create turbulence in the mixing portion of the member 46 to provide a more thorough and uniform mixing of the primary combustion products and the oxygen containing air.

The cast ceramic members of element 46 also support in this embodiment the heating element 48 at a position just to the downstream side of trailing members 54b. The heating element preferably consists of selectively activated resistance heating wires 64 running in both the vertical and horizontal directions and held in place by extending ceramic flange members 66 (66a, 66b, 66c). The wires 64, when selectively activated as described below, are heated to incandescence and thereby heat the mixed gases passing therethrough to promote secondary combustion in the secondary combustion chamber 36. This appears to effect substantially complete combustion of the unburned primary combustion chamber gases in the secondary combustion chamber.

To maintain the gases at the high temperature required for secondary combustion, approximately the lower half of the secondary combustion chamber is preferably lined with a refractory insulating material 68. This prevents cooling of the burning gas mixture and tends to ensure a more complete combustion of the gases. The spent gases from the secondary combustion chamber, in the preferred embodiment, then pass through a baffling system described in detail below and exit through a flue exit opening at flue collar 70.

As noted above, in the preferred embodiment of the invention, the electrical heating element 48 is selectively activated. This saves electrical input energy and reduces operating costs. Illustrated heating element 48 operates only when secondary combustion is incomplete; and therefore a detection device 72, supported for example by back wall 12g and positioned in the path of the existing flue gases measures the combustion products content of the spent flue gases from the secondary combustion chamber and directly controls, for example through a relay 73 or any other convenient control mechanism, activation of the electric heating element 48 (FIG. 7). Detection device 72 may be, for example, a photodetector which measures obscuration in the exiting gases. Thus, if the unburned products of combustion after secondary combustion are below a predetermined level or threshold, the heating element 48 is not activated whereas if the unburned combustion products present in the existing flue gases are above the predetermined threshold, the heating element 48 is activated to increase the degree of secondary combustion.

The Flame Path

Behind the fireback baffle 38 are a plurality of connection smoke passages 80, 82, which provide a circuitous path from the secondary combustion chamber to the flue exit opening at flue collar 70. These passages direct the spent flue gases from the secondary combustion chamber to the left end of the illustrated apparatus through passage 80, then upward into the upper channel or passage 82 back toward the right-hand portion of the stove, where they pass adjacent detection device 72 and exit through the flue collar 70.

The secondary combustion chamber, taken together with the smoke passages, make up the flame path. Since the heat of the flue gases is considerable, and is transferred to the surfaces of the stove as the flue gases traverse the passages, a significant amount of heat is given off to the room, especially through the side and back frame members, rather than being lost up the chimney. In addition, since the passages are adjacent to the primary combustion chamber, higher temperatures are maintained within the fire mass itself, which aids in burning the volatile gaseous products escaping from the burning wood.

The illustrated flue collar 70 is attached to the top panel 12h and provides a vertical or top exit for the spent flue gases. In other embodiments of the invention, the flue collar can be attached, for example, to an upper portion of back panel member 12g to provide a rear exit for the flue gases.

The Primary Air Flow Path

As noted above, the thermostatically controlled inlet port 22 supplies air for the primary air flow path. Ambient air enters the apparatus through aperture 30 in frame back wall 12g and almost immediately divides between the side branch 24a and the back branch 24b. That portion of the incoming air which passes into the back branch 24b is directed along the back of fireback baffle 38 and is constrained to follow a path adjacent to the fireback baffle by an enclosing member 94. Fireback baffle 38 has a plurality of holes 96 extending therethrough for providing preheated primary air to the back of the primary combustion chamber. Illustrated enclosing member 94 is a cast iron plate and branch 24b has a substantially constant cross-sectional area long its length.

That portion of the ambient air passing through aperture 30 which follows side branch 24a passes through the baffle 38 at a lower section of the baffle (FIG. 3) and is directed into the primary combustion chamber along a periodically slotted conduit 98 which extends from baffle 38, along side walls 12a (below side door 14) and for approximately one-fifth the distance along a bottom section of front wall 12c. The slotted conduit has a cross-sectional area which is substantially constant and is partially open at its end 100. Primary air is thus provided to promote a uniform flow of combustion supporting oxygen across the entire primary combustion chamber.

The air provided by primary flow branches 24a and 24b thus enters the primary combustion chamber along the bottom back and bottom left-hand boundary surfaces of the chamber (looking from the front), and provides combustion along the entire bottom of the wood supply. Upon reaching the right-hand portion of the primary combustion chamber, the air flow (now containing volatiles) continues through channels 50 and, mixed with secondary air, through heating element 48 into the secondary combustion chamber and exits through the circuitous flow path provided by the back baffle system arrangement extending between baffle 38 and rear wall 12g.

Details of the Back Baffle System

Referring to FIGS. 3 and 4, the back baffle system for directing the flue gases along the circuitous path through the space between baffle 38 and back wall 12g consists of a lower baffle 120, an upper baffle 122, and a vertical plate member 124. Illustrated lower baffle 120 consists of a cast plate member which extends in a transverse direction between the fireback 38 and the back wall of the frame. Illustrated baffle 120 extends lengthwise from the substantially triangular shaped, vertical plate member 124 to the vertical panel 40. Plate member 124 extends transversely between the fireback 38 and back wall 12g and vertically from a level near the bottom of door 14 (preferably from lower baffle 120) to a position above the top of door 14 (and preferably to the upper baffle 122). Triangular plate 124 provides a barrier to prevent flue gases in the space behind the fireback from escaping through an opened side door.

The upper baffle 122 extends above baffle 120 and consists of a cast plate member extending substantially from vertical baffle 40 to a position near side wall 12a. Baffle 122 thereby creates an aperture 126 so that the flue gases pass from the lower horizontally directed passage 80 through aperture 126 to the upper horizontally directed passage 82 from which they exit through flue collar 70.

The Damper

The damper 18 of the heating apparatus enables the apparatus to be used both as a parlor stove and as a fireplace. When the damper is in the substantially vertical position shown in FIG. 4, the heating apparatus operates as a stove and the flue gases exit substantially as shown by the arrow 128 (FIG. 3). When the damper is placed in a substantially horizontal position indicated by dotted lines 130 (FIG. 4), the apparatus can be used not only as a stove but also as a fireplace (with front door 12e, 12f open) with the flue gases exiting from the primary combustion chamber along a path generally indicated by arrow 102. This provides updraft combustion. There is no secondary combustion in the illustrated updraft configuration.

When fuel is loaded into the apparatus through side door 14, the flue must be in the closed position (the damper in a horizontal position) or otherwise, smoke will pour out of door opening. An interlocking arrangement between the door 14 and the damper 18 ensures that the flue is closed before the side door 14 can be fully opened. The illustrated arrangement consists of a handle 20 on the damper which is in the vertically downward position and engages door 14 if the door is opened and the flue is not closed. Other arrangements can also be used.

Thus the present invention provides an effective apparatus for reducing the volatiles found in either a typical updraft combustion configuration or a horizontal combustion configuration, wherein the flames move horizontally in the primary combustion zone. In either configuration, the provision of a mixing element followed by a heating element in the path of unburned gases leaving the primary combustion chamber provides more efficient operation of the stove. The apparatus thus aids the burning of the primary volatile gases. There is thus provided a wood burning heating apparatus having an unexpectedly high overall efficiency (that is, taking into account the power consumed by the heating element) as a result of the electrically aided secondary combustion.

Other embodiments of the invention, including additions, subtractions, deletions, and other modifications of the disclosed preferred embodiment will be obvious to those skilled in the art and are within the scope of the following claims.

What is claimed is:

1. A heating apparatus comprising
   a heat conducting frame member enclosing
     a primary combustion chamber, and
     a secondary combustion chamber in gaseous communication with said primary combustion chamber,
   a baffle for separating said primary and secondary combustion chambers, said baffle having an opening connecting said primary and secondary combustion chambers for providing said gaseous communication therebetween,
   a first air supply means for providing air for promoting combustion in said primary combustion chamber,
   air mixing means for promoting a uniform turbulent mixing of air with combustion products from said primary combustion chamber to provide a mixed gas flow,
   a second air supply means for providing sufficient air to said air mixing means for complete secondary combustion,
   an electric heating member positioned adjacent said mixing means selectively operable for heating the mixed gas flow from said mixing means to promote secondary combustion of said combustion products for providing an increased heat output from said heating apparatus, said heating member extending across the mixed gas flow, and
   a combustion products exit aperture at a top portion of said frame and in gaseous communication with said secondary combustion chamber for providing an exit port for secondary combustion products.

2. The heating apparatus of claim 1 further including means extending at least along said baffle for providing preheated air to said mixing means.

3. The heating apparatus of claim 1, further including means for positioning said electric heating apparatus in the path of said mixed gas flow substantially at said opening.

4. The heating apparatus of claim 3 including means for supporting said mixing means substantially at said opening.

5. A wood burning heating apparatus comprising
   a heat conducting frame member enclosing
     a primary combustion chamber, and a secondary combustion chamber in gaseous communication with said primary combustion chamber, a vertically oriented, downwardly directed baffle for separating said primary and secondary combustion chamber, said baffle having an opening connecting said primary and secondary combustion chambers for providing gaseous communication therebetween in a horizontal combustion arrangement, a first air supply means for providing air for promoting combustion in said primary combustion chamber, an air mixing means for turbulently mixing air with combustion products from said primary combustion chamber to provide a uniformly mixed gas flow, means for supporting said air mixing means substantially at said opening between said primary and secondary combustion chambers, a second air supply means for providing sufficient air to said air mixing means for complete secondary combustion, an electric heating member positioned adjacent said air mixing means for heating the mixed gas flow from said mixing means to promote secondary combustion in said secondary combustion chamber for providing an increased heat output from said heating apparatus, a smoke detecting element positioned in the path of the combusted gases of said secondary combustion chamber, means responsive to the state of the smoke detecting element for selectively activating said electric heating member for heating said mixed gas flow, said heating member comprising a plurality of heating wire elements, and including a means for supporting the elemens in a grid of perpendicularly arranged non-contacting wires, and a combustion products exit aperture at a top portion of said frame and in gaseous communication with said secondary combustion chamber for providing an exit port for secondary combustion products.

6. A heating apparatus comprising
a heat conducting frame member enclosing
a primary combustion chamber, and
a secondary combustion chamber in gaseous communication with said primary combustion chamber, a baffle for separating said primary and secondary combustion chambers, said baffle having an opening connecting said primary and secondary combustion chambers for providing said gaseous communication therebetween, means for vertically orienting said baffle in a downwardly directed direction whereby said opening is spaced from a bottom surface of said frame for providing a horizontal combustion apparatus, a first air supply means for providing air for promoting combustion in said primary combustion chamber, air mixing means for promoting a uniform tubulent mixing of air with combustion products from said primary combustion chamber to provide a mixed gas flow, a second air supply means for providing sufficient air to said air mixing means for complete secondary combustion, an electric heating member positioned adjacent said mixing means selectively operable for heating the mixed gas flow from said mixing means to promote secondary combustion of said combustion products for providing an increased heat output from said heating apparatus, the heating member extending across the mixed air flow, and a combustion products exit aperture at a top portion of said frame and in gaseous communication with said secondary combustion chamber for providing an exit port for secondary combustion products.

7. A heating apparatus comprising
a heat conducting frame member enclosing
a primary combustion chamber, and
a secondary combustion chamber in gaseous communication with said primary combustion chamber, a baffle for separating said primary and secondary combustion chambers, said baffle having an opening connecting said primary and secondary combustion chambers for providing said gaseous communication therebetween, a first air supply means for providing air for promoting combustion in said primary combustion chamber, air mixing means for promoting a uniform tubulent mixing of air with combustion products from said primary combustion chamber to provide a mixed gas flow, a second air supply means for providing sufficient air to said air mixing means for complete secondary combustion, an electric heating member positioned adjacent said mixing means selectively operable for heating the mixed gas flow from said mixing means to promote secondary combustion of said combustion products for providing an increased heat output from said heating apparatus, said heating member extending across the mixed air flow, a combustion products exit aperture at a top portion of said frame and in gaseous communication with said secondary combustion chamber for providing an exit port for secondary combustion products, a secondary combustion efficiency measuring element for measuring the completeness of said secondary combustion, and means responsive to the state of said measuring element for selectively activating said electric heating member for heating said mixed gas flow.

8. The heating apparatus of claim 7 wherein said electric heating member comprises a plurality of thin electric resistance heating elements, and further including means for supporting said elements in a rectilinear array.

9. The heating apparatus of claim 8 wherein said secondary efficiency measuring element is a photoelectric detecting element positioned in the path of said secondary combustion products for measuring obscuration of said secondary combustion products.

10. The heating apparatus of claim 8 wherein
said heating elements are wire elements, and
further including means for supporting said elements in an array of perpendicularly arranged grid of wires.

11. A heating apparatus comprising
a heat conducting frame member enclosing
a primary combustion chamber, and a secondary combustion chamber in gaseous communication with said primary combustion chamber, a baffle for separating said primary and secondary combustion chambers, said baffle having an opening connecting said primary and secondary combustion chambers for providing said gaseous communication therebetween, a first air supply means for providing air for promoting combustion in said primary combustion chamber, air mixing means for promoting a uniform turbulent mixing of air with combustion products from said primary combustion chamber to provide a mixed gas flow, said mixing means having means for creating a plurality of venturi passages having a low pressure section for urging said air to mix with said primary combustion products, a second air supply means for providing sufficient air to said air mixing means for complete secondary combustion, an electric heating member positioned adjacent said mixing means selectively operable for heating the mixed gas flow from said mixing means to promote secondary combustion of said combustion products for providing an increased heat output from said heating apparatus, and a combustion products exit aperture at a top portion of said frame and in gaseous communication with said secondary combustion chamber for providing an exit port for secondary combustion products.

12. The heating apparatus of claim 11 further comprising means for creating turbulence in said mixed gas flow for promoting a more uniform mixing of said gases.

13. A method for increasing combustion efficiency in and the heat output of a wood burning parlor stove comprising the steps of turbulently mixing combustion products from a primary combustion zone with an oxygen containing atmosphere at a mixing flow zone to produce a substantially uniform mixture of the combustion products and oxygen containing atmosphere;

selectively heating said mixture to a temperature at which secondary combustion of said mixture occurs by exposing said mixture to a selectively operated, electrical heating element positioned adjacent to said mixing zone and across the path of the mixed gas flow for heating the mixed gas flow across its cross section; and providing an exit aperture for the secondary combustion products to exit from the stove while providing an increased heat output from said stove.

14. A method for increasing combustion efficiency in and heat output of a wood burning parlor stove comprising the steps of turbulently mixing combustion products from a primary combustion zone with an oxygen containing atmosphere at a mixing flow zone to produce a substantially uniform mixture of the combustion products and oxygen containing atmosphere;

selectively heating said mixture to a temperature at which secondary combustion of said mixture occurs by exposing said mixture to a selectively operated, electrical heating element positioned adjacent to said mixing zone and across the path of the mixed gas flow for heating the mixed gas flow across its cross section;

generating from said secondary combustion products a measure representative of the unburned combustibles;

activating said electric heating element whenever said measure is greater than a predetermined threshold; and providing an exit aperture for the secondary combustion products to exit from the stove while providing an increased heat output from said stove.

15. The method of claim 14 further including the step of inducing a flow of oxygen containing air into said mixing zone through a venturi effect.

* * * * *

UNITED STATES PATENT AND TRADEMARK OFFICE
CERTIFICATE OF CORRECTION

PATENT NO. : 4,249,509
DATED : February 10, 1981
INVENTOR(S) : Duncan C. Syme

It is certified that error appears in the above-identified patent and that said Letters Patent are hereby corrected as shown below:

In the specification:

Col. 1, line 11, "looking" should read --looked--.

Col. 1, line 47, "Catings" should read --Castings--.

Col. 1, line 48, "Randolpha" should read --Randolph--.

Col. 5, line 63, "existing" should read --exiting--.

Col. 6, line 6, "existing" should read --exiting--.

Col. 6, line 12, "connection" should read --connecting--.

Signed and Sealed this

Twenty-third Day of June 1981

[SEAL]

Attest:

RENE D. TEGTMEYER

Attesting Officer

Acting Commissioner of Patents and Trademarks